(12) United States Patent
Corston-Oliver et al.

(10) Patent No.: US 7,398,203 B2
(45) Date of Patent: *Jul. 8, 2008

(54) LINGUISTICALLY INTELLIGENT TEXT COMPRESSION

(75) Inventors: Simon H. Corston-Oliver, Seattle, WA (US); Sharad Mathur, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/397,503

(22) Filed: Apr. 4, 2006

(65) Prior Publication Data

US 2006/0184351 A1 Aug. 17, 2006

Related U.S. Application Data

(63) Continuation of application No. 09/770,779, filed on Jan. 26, 2001, now Pat. No. 7,069,207.

(51) Int. Cl.
*G06F 17/20* (2006.01)
*G06F 17/21* (2006.01)

(52) U.S. Cl. .................. 704/9; 715/254; 704/1

(58) Field of Classification Search ........ 704/1, 704/9–10; 715/534, 254
See application file for complete search history.

(56) References Cited

U.S. PATENT DOCUMENTS

| | | | | |
|---|---|---|---|---|
| 4,333,152 | A | 6/1982 | Best | 704/251 |
| 5,410,475 | A | 4/1995 | Lu et al. | 704/1 |
| 5,708,822 | A | 1/1998 | Wical | 704/1 |
| 5,907,841 | A | 5/1999 | Sumita et al. | 707/6 |
| 6,026,410 | A | 2/2000 | Allen et al. | 704/270 |
| 6,112,168 | A | 8/2000 | Corston et al. | 704/9 |
| 6,279,018 | B1 | 8/2001 | Kudroll et al. | 715/540 |
| 6,289,304 | B1 | 9/2001 | Grefenstette | 704/9 |
| 6,493,663 | B1 | 12/2002 | Ueda | 704/9 |
| 6,535,886 | B1 | 3/2003 | Koontz | 704/9 |
| 6,766,287 | B1 | 7/2004 | Kupiec et al. | 704/9 |
| 2002/0046018 | A1 | 4/2002 | Marcu et al. | 704/9 |

FOREIGN PATENT DOCUMENTS

EP 0952533 A2 10/1999

OTHER PUBLICATIONS

Knight et al. "Statistics-Based Summarization—Step One: Sentence Compression". In Proceedings of the 17th National Conference on Artificial Intelligence, Austin, 2000.*

(Continued)

*Primary Examiner*—Patrick N. Edouard
*Assistant Examiner*—James S Wozniak
(74) *Attorney, Agent, or Firm*—Joseph R. Kelly; Westman, Champlin & Kelly, P.A.

(57) ABSTRACT

A text processor processes text in a message. The text processor generates a plurality of compressed forms of components of the message. The processor performs a linguistic analysis on the body of text to obtain a linguistic output indicative of linguistic components of the body of text. The processor then generates the plurality of compressed forms that can be used to compress the body of text. The plurality of compressed forms are generated based on the linguistic output. The invention can be implemented as a method of generating the compressed forms and as an apparatus.

16 Claims, 6 Drawing Sheets

OTHER PUBLICATIONS

Gregory Grefenstette 1998. "Producing Intelligent Telegraphic Text Reduction to provide an Audio Scanning Service for the Blind" AAAI 1998 Spring Symposium Series, Standford, CA 111-117.

Reimer et al; "Text Condensation as Knowledge Base Abstraction"; Artificial Intelligence for Applications, 1988., Proceedings of the Fourth Conference on, Mar. 14-18, 1988, pp. 338-344.

Christopher Upward. Cut Spelling: A handbook to simplifying written English by omitting redundant letters. $2^{nd}$ ed. 1996. Simplified Spelling Society, Birmingham, UK. Chapter 1.

Simon Corston-Oliver. Text compaction for display on very small screens. Jun. 2001, Association for Computational Linguistics. In "Proceedings of the Workshop on Automatic Summarization", NAACL 2001. Carnegie Mellon University, Pittsburgh, PA.

U.S. Appl. No. 09/770,779 Office Action dated Jul. 16, 2004.
U.S. Appl. No. 09/770,779 Amendment dated Oct. 15, 2004.
U.S. Appl. No. 09/770,779 Interview Summary dated Feb. 15, 2005.
U.S. Appl. No. 09/770,779 Office Action dated Mar. 30, 2005.
U.S. Appl. No. 09/770,779 Response dated Apr. 26, 2005.
U.S. Appl. No. 09/770,779 Advisory Action dated May 23, 3005.
U.S. Appl. No. 09/770,779 Request for Continued Examination and Amendment dated Jun. 14, 2005.
U.S. Appl. No. 09/770,779 Office Action dated Sep. 6, 2005.
U.S. Appl. No. 09/770,779 Amendment dated Oct. 28, 2005.
U.S. Appl. No. 09/770,779 Final Office Action dated Jan. 18, 2006.
U.S. Appl. No. 09/770,779 Amendment dated Mar. 16, 2006.
European Office Action for Application No. 02 001 811.5-1527 dated Jul. 2, 2006.

* cited by examiner

LINGUISTICALLY INTELLIGENT TEXT COMPRESSION

The present application is a continuation of and claims priority of U.S. patent application Ser. No. 09/770,779, filed Jan. 26, 2001, the content of which is hereby incorporated by reference in its entirety.

BACKGROUND OF THE INVENTION

The present invention deals with messaging on devices with limited display space. More specifically, the present invention deals with compressing text, in a linguistically intelligent manner, such that it can be more easily displayed on small screens.

Messaging is widely available on current computer systems. Messages can be sent through voice mail, electronic mail (email), paging, and from other sources or means. Further, the messages from a variety of sources can be integrated and forwarded to a single device. For example, a user who is currently receiving messages at a computer or computer network through voice mail and electronic mail may forward those messages to a cellular phone equipped to receive such messages. However, the screen of a cellular phone has quite limited display space. This can present significant problems when trying to display messages.

For example, even very short electronic mail messages, or transcribed voice mail messages, can present text which is too voluminous to be viewed on a single screen of a cellular phone. This often requires the user to either decipher an entire message from the first few words of the message (since that is all that can be displayed), or to scroll down through many lines of text in order to read the entire message. Both approaches are cumbersome and can lead to errors.

While text compression has conventionally been used in many different contexts, the purpose of such compression has primarily been to enable efficient data storage of text. Such compression techniques are completely inapplicable to contexts in which the compressed text must be deciphered by humans.

SUMMARY OF THE INVENTION

A text processor processes text in a message. The text processor generates a plurality of compressed forms of components of the message. The processor performs a linguistic analysis on the body of text to obtain a linguistic output indicative of linguistic components of the body of text. The processor then generates the plurality of compressed forms that can be used to compress the body of text. The plurality of compressed forms are generated based on the linguistic output. The invention can be implemented as a method of generating the compressed forms and as an apparatus.

Another aspect of the invention includes a data structure generated based on the linguistic analysis of the text. The data structure includes a plurality of fields that contain attributes indicative of the plurality of compressed forms of portions of the body of text. The data structure can also include a compression type field indicative of a type of compression used to generate at least one of the attributes contained in the fields of the data structure.

DETAILED DESCRIPTION OF ILLUSTRATIVE EMBODIMENTS

Figure 1:
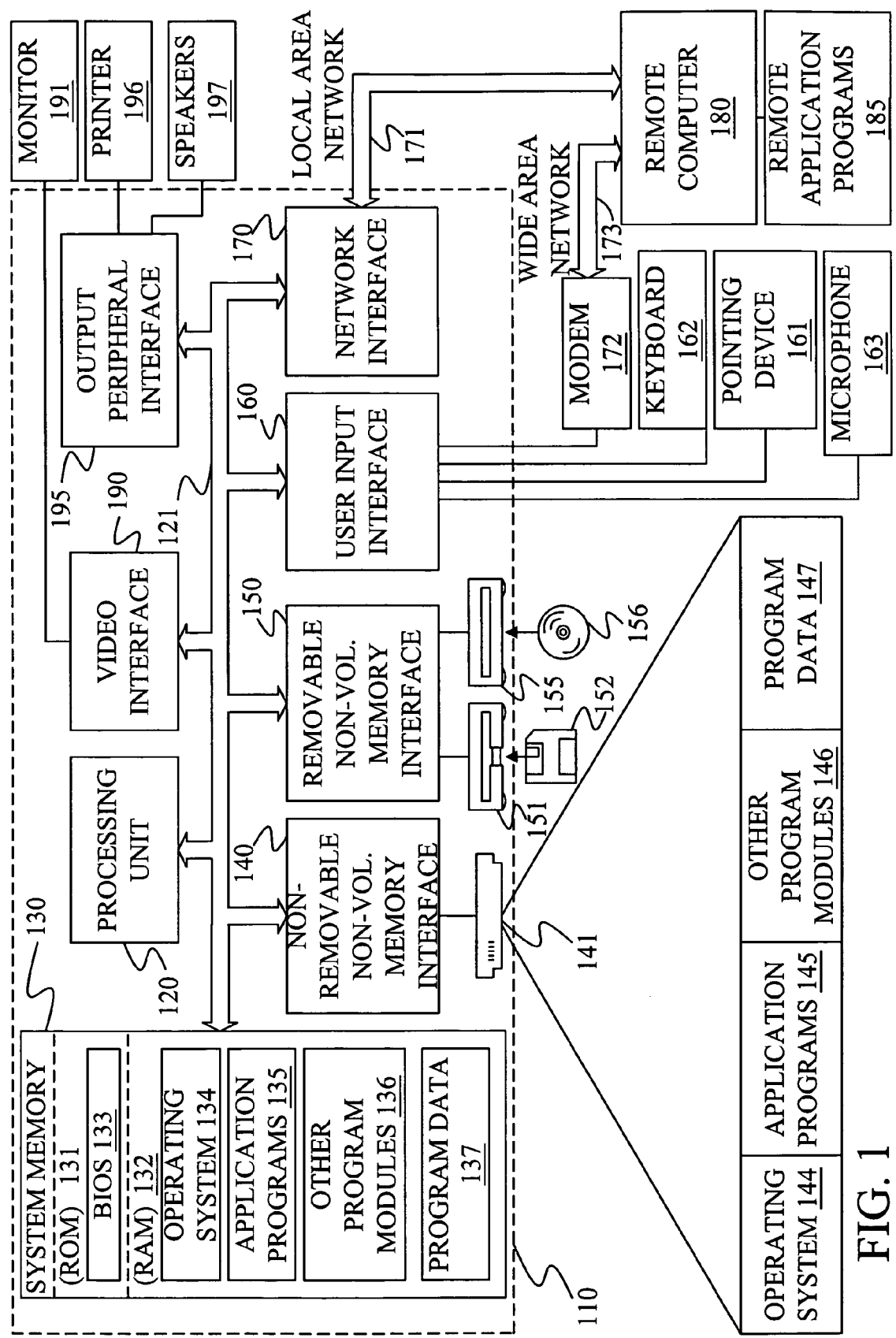
FIG. 1 is a block diagram of an embodiment in which the present invention may be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
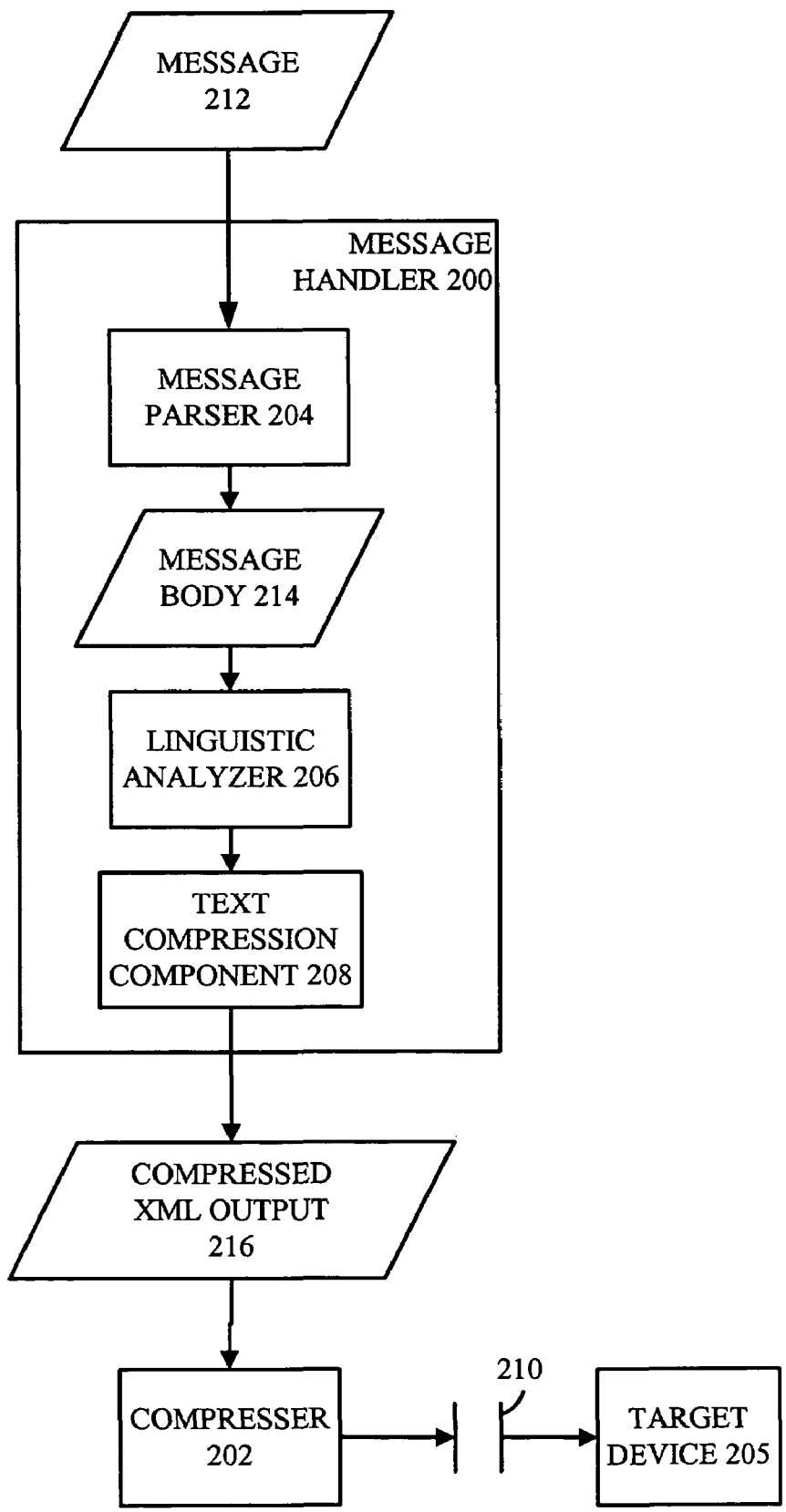
FIG. 2 is a block diagram of a message handler for performing linguistic analysis in accordance with one embodiment of the present invention.

FIG. 2 is a block diagram of one illustrative embodiment of a number of components that can be used to implement the present invention. FIG. 2 includes a message handler 200 a compressor 202 and a target device 204. Message handler 200 illustratively includes a message parser 204, linguistic analyzer 206 and text compression component 208. In one illustrative embodiment, target device 204 is a cellular phone or other small screen device which is connected to compressor 202 through link 210. Link 210 can be a global computer network that may or may not include radio transmission portions, or any other suitable link for transmitting messages to target device 204.

Message handler 200 illustratively receives message 212. Message 212 can be from one of a variety of sources, including a paging system, electronic mail, voice mail, etc. Message 212 thus illustratively includes a variety of parts including a header, a body of text, and, in the case of email, previous messages in the email thread. Parser 204 parses message 212 into its various parts. The operation of parser 204 is irrelevant to the present invention. All that is relevant is that a message body 214, or other textual body to be compressed, is identified and provided to analyzer 206. This can be done in any known way and does not form part of the present invention. Therefore, parser 204 will not be described in detail. Suffice it to say that parser 204 may remove header information and possibly previous mail messages, and provide the message body 214 to linguistic analyzer 206.

Of course, it should be noted that parser 204 may provide any other natural language body of text to analyzer 206, other than message body 214. For example, the body of text may be a subject header, a task description header, a web page, etc. The present discussion proceeds with respect to message body 214 as but one example of text to be analyzed.

Linguistic analyzer 206 illustratively includes a lexical analyzer, a morphological analyzer, and a syntax analyzer. The lexical analyzer receives message body 214 and breaks it into words (or other tokens). This is done in a known manner. The morphological analyzer accesses a morphological database (such as a dictionary) and obtains a variety of information associated with each word (or token), such as the meaning, the part-of-speech, etc. The syntactic analyzer performs a syntactic analysis of the message body 214 to obtain a syntactic parse tree (or syntactic analysis structure) for each sentence in the message body and outputs that structure as the output of linguistic analyzer 206. This is also done in a known manner and is briefly illustrated with respect to FIG. 3.

Text compression component 208 accesses the linguistic analysis output by linguistic analyzer 206 and generates a plurality of different optional compressions of the components of message body 214. In one illustrative embodiment, text compression component 208 provides five attributes for each word or phrase in message body 214. Generally, each of the attributes represents a more aggressive compression of each word under analysis. In one illustrative embodiment, the data structure output by text compression component 208 includes the following attributes:

ShortType which designates one type of compression rules being applied;

LongForm which is the form of the word as written in message body 214;

ShortForm which is the form of the word after applying the compression rules or techniques identified by the ShortType attribute;

CaseNormalizedForm which capitalizes the first letter in the ShortForm and provides the remaining letters in lower case; and CompressedForm, which is a compressed form of the CaseNormalizedForm and subjects the CaseNormalizedForm to additional compression rules in an effort to further compress the word.

In one illustrative embodiment, the data structure including these attributes is output as a compressed XML output 216 and is provided to the compressor component 202. Compressor component 202 may illustratively choose one of the compressed forms in the compressed output 216 and provide it to target device 204. Compressor component 202 may illustratively choose the compressed form based on the screen space available on target device 204, or other criteria. It should be noted that compressor component 204 does not form part of the present invention.

Figure 3:
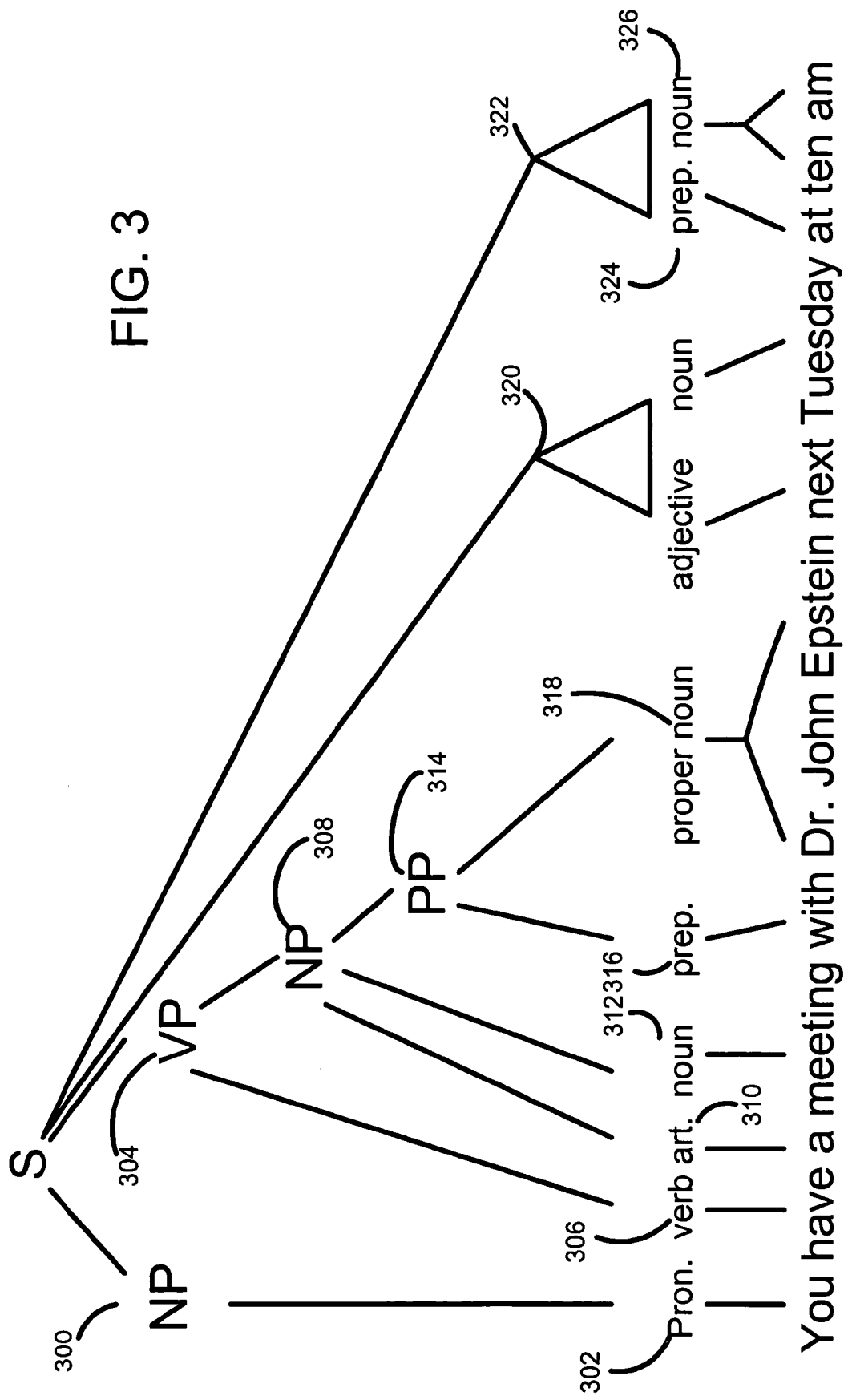
FIG. 3 is a diagram of a portion of a syntax parse tree for an exemplary sentence.

FIG. 3 is one illustrative embodiment of a sentence which may reside in a message body 214. The sentence reads "You have a meeting with Dr. John Epstein next Tuesday at ten a.m." Of course, message body 214 is provided to the lexical analyzer which breaks the message body into sentences and into individual words (or tokens). The morphological analyzer then performs a look up of each word (or token) and identifies part-of-speech and other possible information desired for analysis. Therefore, it can be seen that the words are identified with the parts-of-speech as follows:

you=pronoun have=verb a=article meeting=noun with=preposition

Dr. John Epstein=proper noun next=adjective

Tuesday=noun at=preposition; and ten a.m.=noun.

The syntactic analyzer analyzes the sentence and parts-of-speech into a syntax parse tree, in one illustrative embodiment, as indicated in FIG. 3. The terminal nodes (or leaf nodes) in the syntax parse tree represent the words in the sentence, while the non-terminal nodes represent phrases or other upper level syntactic units identifying portions of the sentence. In the syntax parse tree illustrated in FIG. 3, the designation "S" represents a sentence node, while the designation "NP" represents a noun phrase, "VP" represents a verb phrase, and "PP" represents a prepositional phrase. The triangles above "next Tuesday" and "at ten a.m." simply indicate that those phrases can be further analyzed into nodes which have been eliminated for the sake of simplicity. The syntax parse tree indicates that the sentence is formed of a noun phrase, followed by a verb phrase, followed by two other syntactic components which are not specifically analyzed herein.

Text compression component 208 illustratively compresses the sentence shown in FIG. 3, in a linguistically intelligent manner, such that it can be deciphered by a human. In performing such compression, a number of problems present themselves. For example, it may be intuitive to delete all of certain types of words in the text. For instance, it may be intuitive to delete all articles in the text. However, while this may work in English, it does not work in other languages. In fact, it does not even work in all of the Romance languages. Take for example, the French phrase Je le lui ai fait manger which is translated as "I made him eat it." It should be noted that the clitic pronoun "le" looks exactly like the definite masculine article "le" (which is translated as "the"). Therefore, if all "articles" or words "the" and their equivalents in the different languages were removed, this would drastically change the meaning of some phrases in different languages.

Similarly, it may seem intuitively reasonable to remove all spaces in the text. However, where electronic mail aliases or uniform resource locators (URLs) are provided in the message, removing the spaces would make it very difficult to tell where the email aliases or URL reside within the text. Many such symbol sensitive text fragments are used in messages today. If case or symbols are changed in the fragment, the entire fragment irretrievably loses its meaning. Take, for example, the phrase "Visit http://microsoft.com for information". If this were reduced to "visithttp://microsoft.comforinfo" it is very difficult to determine where the URL ends within the text fragment.

Therefore, the present invention does not take such an unintelligent and uniform approach. Instead, the present invention bases its compression on the linguistic analysis performed by analyzer 206.

Figure 4:
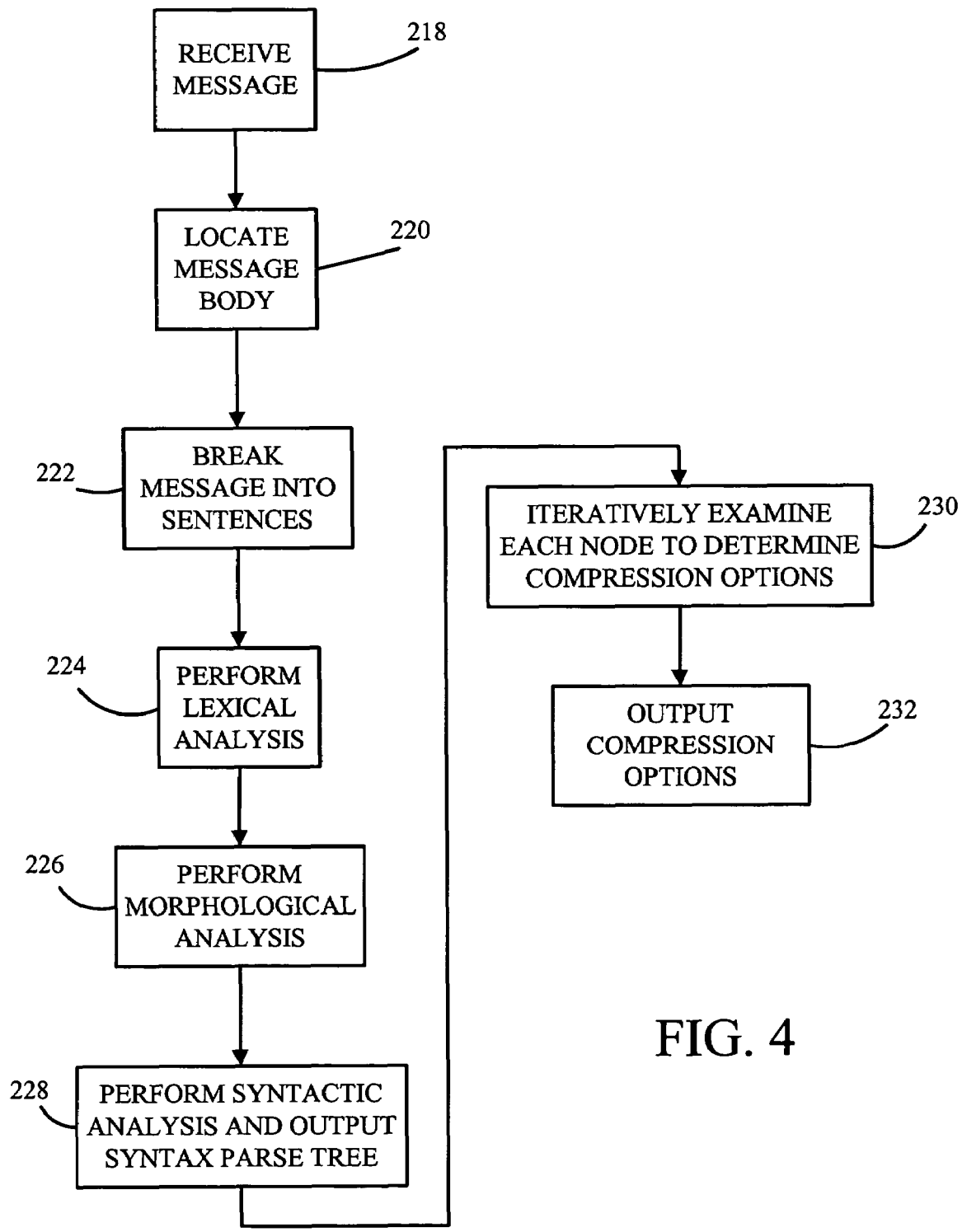
FIG. 4 is a flow diagram of the overall operation of the system shown in FIG. 2.

FIG. 4 is a flow diagram which illustrates in a bit greater detail the operation of message handler 200. First, message handler 200 receives message 212. This is indicated by block 218. Parser 204 locates the message body in message 212 and passes message body 214 to analyzer 206. This is indicated by block 220. Analyzer 226 breaks the message 214 into sentences. This is indicated by block 222. The lexical analyzer component of analyzer 206 then performs a lexical analysis of the text body to break the sentences into tokens such as words, numbers and punctuation symbols. Tokens can also consist of more than a single word, such as multi-word expressions like "along with" or "by means of". This is indicated by block 224. The morphological analyzer in linguistic analyzer 206 then performs its morphological analysis and thus locates parts-of-speech, and other relevant information corresponding to each token. This is indicated by block 226. The syntactic analyzer then performs a syntactic analysis and provides, in one illustrative embodiment, a syntax parse tree. This is indicated by block 228.

Text compression component 208 then iteratively examines each of the nodes in the analysis provided by analyzer 206 to determine whether potential compression options are available. This is indicated by block 230. Once the nodes in the analysis have been examined, and the various compression options have been identified, the compression options are output, as, for example, an XML output 216. This is indicated by block 232. Compressor 202 then simply chooses one of the options for each word (or token) and provides the message in compressed form to target device 204.

Figure 5A:
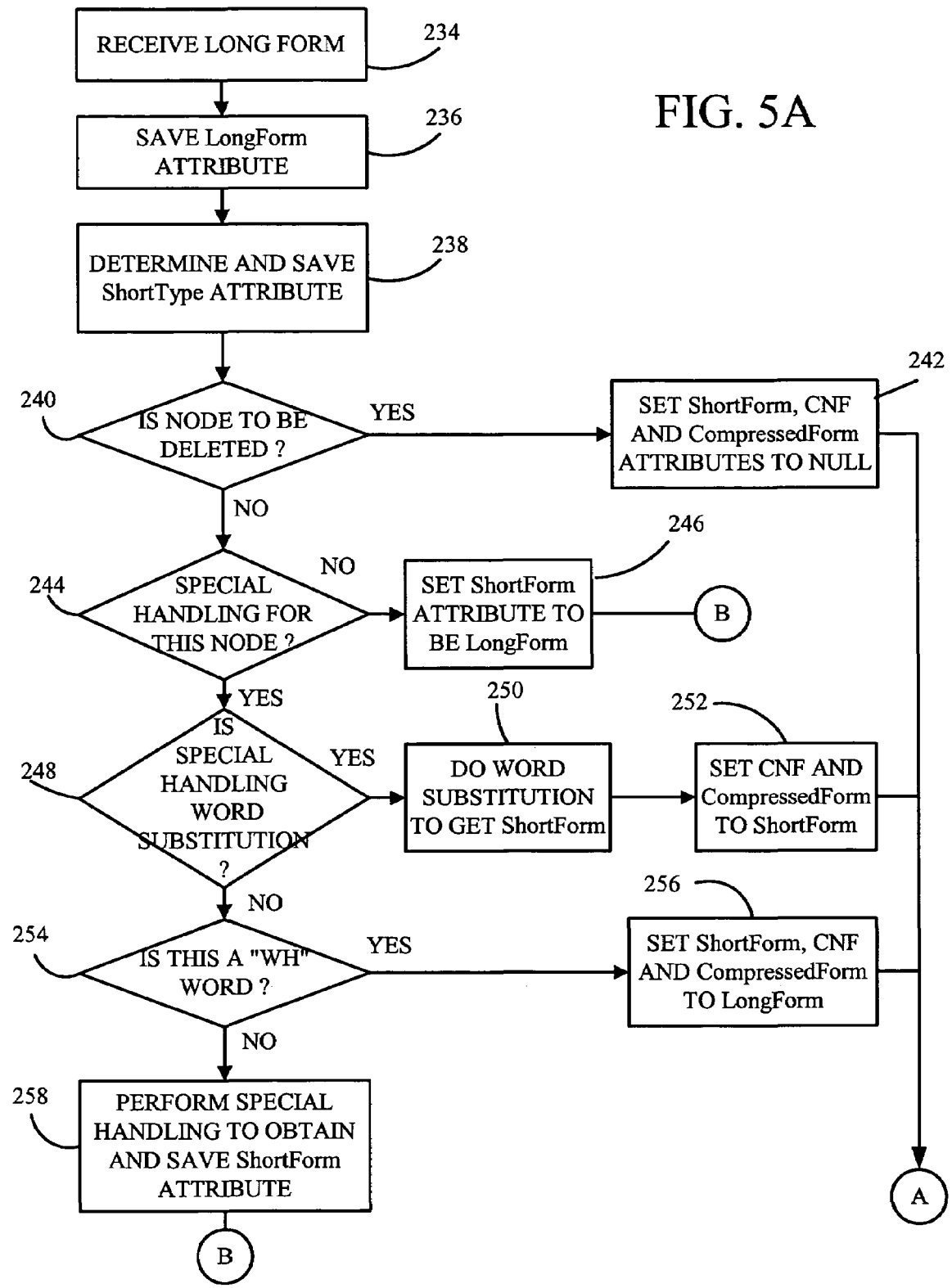
FIGS. 5A and 5B are more detailed flow diagrams illustrating the operation of the system shown in FIG. 2 in generating compression options for terminal nodes (or words and punctuation) in a syntactic analysis.
Figure 5B:
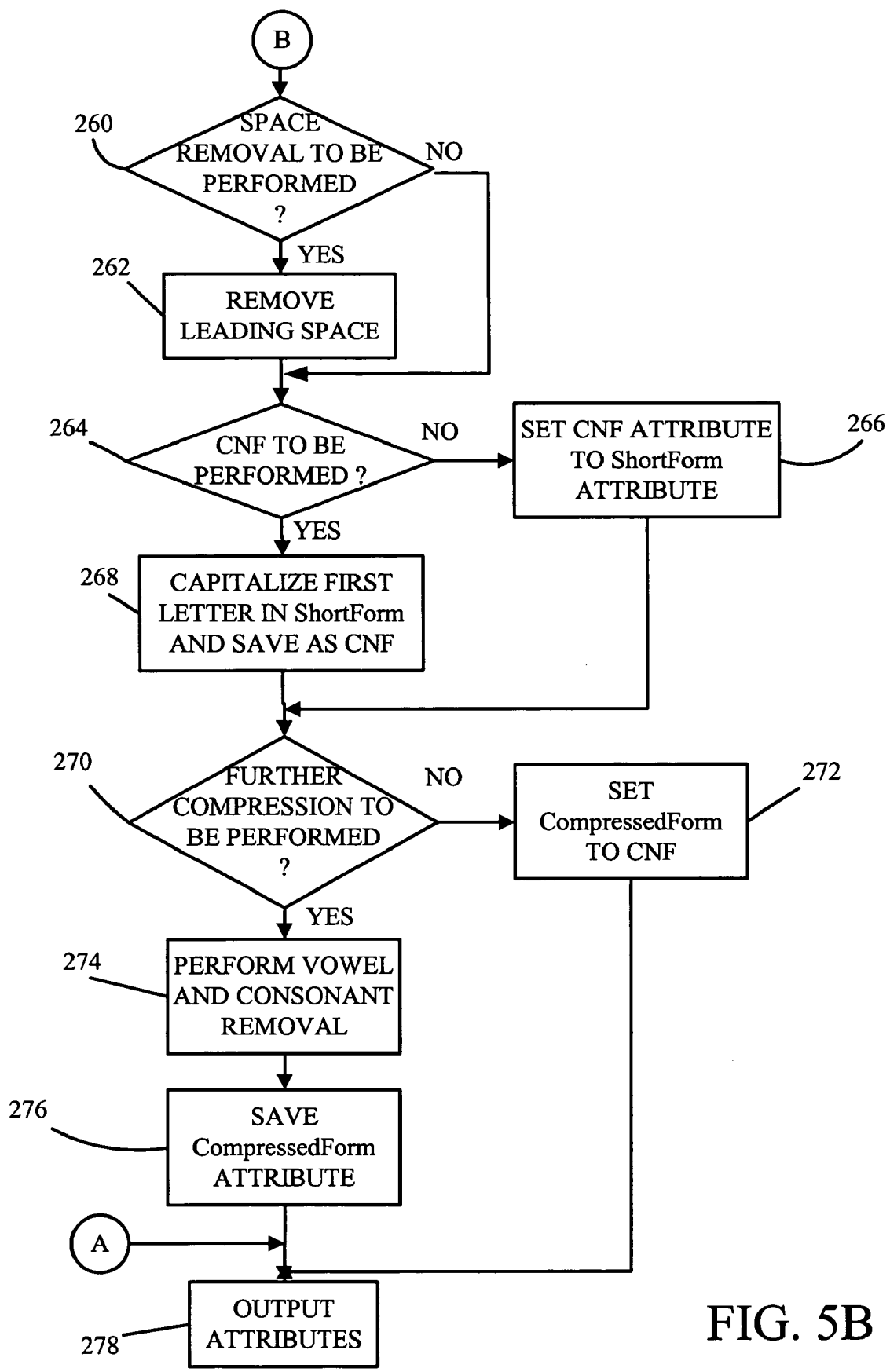

FIGS. 5A and 5B illustrate in better detail the operation of text compression component 208 in generating the potential compression options for the analyzed portions of message body 214. FIGS. 5A and 5B specifically illustrate the operation of text compression component 208 in generating possible compression options for terminal nodes (or leaf nodes) in the analysis output by analyzer 206. In other words, FIGS. 5A and 5B illustrate the treatment of each word (or token) in the text message for potential compression, as opposed to non-terminal nodes which may represent phrases or larger fragments of the message body.

First, the long form of each token is received. Recall that the long form is the form of the token which is written in the text body. This is indicated by block 234 in FIG. 5A. The long form is saved as an attribute that is output in the data structure provided as the compressed output 216. This is indicated by block 236.

Next, the ShortType attribute is determined and saved. Recall that the ShortType attribute is an attribute that indicates the specific type of compression rules applied to the long form of the token. This is indicated by block 238. The various ShortType attributes in accordance with one embodiment of the present invention are discussed at greater length below.

It is then determined whether, using the compression rules identified by the ShortType attribute, the entire node under analysis is to be deleted. For example, some nodes are to be deleted under all circumstances. Articles (which have a ShortType attribute "Articles") in the English language can always be omitted. Such articles include a, the, those, and these, for example. Greetings have ShortType attribute "Greeting" and are also specially handled in block 240. Greetings (such as Dear Bob, Hi, and Hi BOB) can all be deleted. Determining whether the node is to be deleted under all circumstances is indicated by block 240. If so, then as indicated in block 238, the ShortType attribute is set to "Articles" (or whatever is appropriate) and the ShortForm, the CaseNormalizedForms, and the CompressedForm attributes are all set to a null value. This is indicated by block 242.

If, at block 240, it is determined that the node is not to be deleted, in its entirety, it is determined whether any other special handling for this node is to be undertaken. This is indicated by block 244. Such special handling can take a wide variety of forms. A number of those forms will now be discussed.

A group of adjectives (having the ShortType "Adjective") are specially handled. Those include words which begin with "wh", such as which, who and what. Those adjectives are discussed in greater detail below.

English articles were discussed above with respect to block 240. English articles can be omitted under all circumstances. However, articles in other languages may need special handling. For example, German definite articles can be omitted under all circumstances. However, indefinite articles are retained because of ambiguity (since the same form can mean "a" or "one"). Spanish and French definite articles are deleted, but clitic pronouns with the same spelling are not. Indefinite articles in Spanish and French are retained because of ambiguity (since the same form can mean "a" or "one").

Adverbs have the ShortType attribute "Adverbs" and those that are classified as "wh" words (why, how, when, etc.) are not compressed in any fashion, and are dealt with below. Other adverbs undergo character reduction (such as vowel deletion, consonant deletion or both) which is also discussed in greater detail below.

Company names have ShortType attribute "Company" and are also specially handled. The company type is deleted. For example, "Microsoft Corporation" can be converted to simply "Microsoft". The shortened form is subject to character reduction and case normalization as discussed below.

Conjunctions have the ShortType attribute "Conjs" and are specially handled as well. For example, the English conjunction "and", the French "et" and the German "und" are replaced with the ampersand sign. The Spanish "y/e" is not reduced since it is already one letter. All other conjunctions are left as is, and are subjected to the later processing steps.

A number of different types of nouns are specially handled as well. Absolute dates and times are designated with the ShortType "Dates" and are treated in the following way. In all languages, for a month in isolation, the long month name is converted to a short form. Short month names with periods at the end have the period removed. Vowel compression, case normalization, etc. are not performed on the resulting short form. For example, in the phrase "lets meet in November" November is reduced to "Nov". Similarly, the phrase "lets meet in Nov.", has the November abbreviation converted to "Nov" (i.e., the trailing period is stripped).

In all languages, a month (and year) with no day of the month designated is rendered as a short month name alone. For example, the term "November 2001" where "2001" is the present year, is simply reduced to "Nov".

If the date is a month plus a year that is not the current year, it is converted to a numeric month plus a separator plus a numeric year. For example, "Nov 2002" is converted to "11/2002" (for the English and French languages) or "11.2002" (for other European languages).

Similarly, in the American English language, single absolute dates are normalized to month/day/year numerical format. Dates in other languages are normalized to their formats (e.g., Japanese always uses the year-month-day format). In English and French the forward slash mark is used as the separator while in Spanish and German the period is used as the separator.

The year is omitted if it is equal to the year of "today" of if the year plus 2000 is equal to the year of "today". For example, 23 July, 2001 is converted to 7/23. In addition, Monday 23 July is converted to 7/23.

Similarly, midnight receives special handling as well. Midnight is also designated by the ShortType "Dates" and its short form is "12 am". The common collocation "12 midnight" also has the short form "12 am", a special case to avoid the output "12 12 am".

Date ranges in the English language are also subject to special handling. For example, the term "December 5th-9th" is converted to "12/5-9". Also, the date range December 5th-9th, 2002" is converted to "12/5-9/2002".

Offset dates are also treated specially and are given the ShortType "OffsetDate". In the event that a term such as "next Wednesday" is identified in the text, the date on which the message is sent (or authored) is obtained and the offset date "next Wednesday" is resolved. Therefore, if the message was sent on Friday, December 1st, the reference to "next Wednesday" would be December 6th. The term "next Wednesday" would thus be converted to "12/6".

The days of the week are given the ShortType "Days". In all languages, isolated days of the week that cannot be reliably resolved to absolute dates are converted to the short forms of those days. Short day names with periods at the end have the periods stripped therefrom. Vowel compression, case normalization, etc. are not performed on the resulting short form. For example, in the phrase "lets meet on Monday", the term "Monday" is converted to "Mon".

Electronic mail aliases and URL's are also subject to special handling. Electronic mail aliases and URL's are maintained, intact, without case normalization or removal of vowels. Emails are given the ShortType "Email" and URL's are given the ShortType "URL".

Phone numbers are given the ShortType "Phone" and have punctuation removed from the interior thereof. For example, the phone number in the term "call me at (425) 703-7371" is simply converted to "4257037371".

States and countries are given the ShortType "Geo" and are replaced with their conventional abbreviations. For example, "Washington" is replaced by "WA", "Alabama" is replaced by "AL", etc.

Non-language items are given the ShortType "NotLanguage" and linguistic compression is not performed. Examples of such items include:

$x=x+y;$

If $(x=1)\{$

<Some XML>Content</Some XML><Foo/>.

Spelled out numbers are also subject to special handling and are given the ShortType "Number". Spelled out numbers are replaced with Arabic numerals. For example, the English phrase "one thousand four hundred twenty-five" is replaced by "1425". Separators are illustratively not used between thousands.

Denominations of money are also subject to special handling and are provided with the ShortType "Dollars". The term "K" is substituted for thousands. The term "M" is substituted for millions and "B" is substituted for billions. For example, $100,000 is converted $100K, $123,000,000 is converted to $123M, and $2,000,000,000 is converted to $2B. Also, these short forms are not subject to case normalization which will be described below.

Similarly, in one illustrative embodiment, fractions are indicated as well. For example, $2,250,000,000 is converted to $2.25B. Also, numerical amounts which are followed by a currency designator are normalized to the common symbol for the currency along with the number. For example, "one hundred dollars" is converted to "$100". The term "57 pounds" is converted to "#57". "500 Francs" is converted to "500 Fr", etc.

Proper names are subject to special handling and are given the ShortType "PrprN". In languages other than German, multi-part proper names are condensed down to just the first family name, if possible. For example, "Dr. Mary Smith" is converted to "Smith".

It should be noted that for Spanish phrasal last names, they are condensed to the first part (e.g., "Cardoso de Campos" is reduced to "Cardoso"). Also, in one illustrative embodiment, vowel removal is not conducted on proper names.

Similarly, proper names are subjected to dictionary lookup for more common given names. For example, the proper name "Patrick" may be replaced by "Pat". The name "William" may be replaced by "Will", etc. Further, if a given name and a final initial are provided, this is reduced just to the first name.

In the German language, proper names are more troublesome, because the language capitalizes many words in text fragments. Therefore, proper names are not compressed when they are preceded by determiners in the German language.

Possessives are also specially handled and are given the ShortType "Possessive". In the English language, possessives with the "'s" and "s'" clitics can be rewritten without the apostrophe. For example, the term "John's house" can be written as "Johns house". Similarly, the "dog's tails" can be written as "dogs tails".

A number of prepositions are subject to special handling as well and are given the ShortType "Preps". For example, in the English language, some prepositions are summarized through a look up table. For instance, "through" can be summarized as "thru". The word "at" can be summarized with "@". The terms "to" and "for" can also be summarized as the numbers "2" and "4" in certain circumstances. They are only summarized in this way if they are not adjacent to a numeral or a number spelled out in full that has a possible numeral substitution. For example, in the phrase "I want to leave", the term "to" is replaced by the number "2". However, in the phrase "I have been to two good movies lately" the term "to" is not changed to the number "2" since this would result in a possible misconstrual that the speaker had been to twenty-two good movies.

Some pronouns are also subject to special handling and are given the ShortType "Pronouns". For English, the pronoun "you" is replaced "U". All other pronouns stay the same, with no vowel removal. For Spanish, the pronoun "Usted" is replaced "Ud" and "Ustedes" by "Uds". In the German language, the pronouns that include "ein" (plus inflection) are summarized using the numeral "1".

Punctuation is specially handled and is given the ShortType "Punctuation". Punctuation that is not a sentence separator and does not occur inside an email alias or URL is deleted. Essential punctuation is given the ShortType "EssentialPunct". For all languages, the following characters are not deleted: ~: ' ‛?![ ] ( )< > = = " ". In Japanese, the special small circle symbol which is used exclusively as a sentence separator is not deleted either. The semicolon and period are deleted only if they are not sentence-final punctuation. All other characters are marked as NonessentialPunctuation (described below).

However, in one embodiment, sequences of final punctuation are reduced to the first character. Therefore, a phrase such as "Are these things removed?!?" simply has its final punctuation reduced to "?".

Also, for all languages, punctuation that occurs between items which, under other compression rules, may be rendered as digits, are retained. For example, in the phrase "I bought 3 in 1976 and in 1977, 100" the comma after 1977 is retained (or optionally a space is retained) in order to avoid the compression 1977100 and to instead have the compression "1977, 100" or "1977 100".

Similarly, in the English language the inches and foot/feet measurement phrases are converted into " or ' as appropriate.

Other, non-essential punctuation marks are subject to special handling and are given the ShortType "NonessentialPunct". Punctuation inside factoids (such as email addresses, URL's, numeric ranges, etc.) is left intact. Punctuation not inside such factoids can be deleted except for EssentailPunct and punctuation that occurs as a conjunction (e.g, semi-colons to separate clauses).

A number of verbs are also subject to special handling and are given the ShortType "Verbs". Such verbs are subject of dictionary lookups. For example, the word "are" can be replaced by the letter "R", and the word "be" can be replaced by "B". Otherwise, verbs are simply subjected to character reduction and case normalization as described below.

Two other forms of special handling are performed as well. One is given the ShortType "WordSubstitution" which involves substituting words, and the other is the handling of the "wh" words discussed above. A more detailed discussion of those types of special handling is given later in the description.

Discussion now proceeds again with respect to FIGS. 5A and 5B. If none of these special handling cases are to be undertaken at block 244 in FIG. 5A, then the ShortForm attribute associated with the word under analysis is simply set to the LongForm attribute (which, is the form of the word written in the text). This is indicated by block 246.

However, if, at block 244, it is determined that special handling is to be done, it is next determined whether the special handling is word substitution. Word substitution is often simply performed based on a dictionary lookup. Word substitution can be performed, for example, to obtain an acronym for another word or phrase. For instance, in the English language the phrase "as soon as possible" can be substituted with "ASAP".

If the special handling is word substitution, then the necessary word substitution is performed for the word in the text in order to obtain the ShortForm attribute. This is indicated by block 250. If word substitution is successful, then the CaseNormalizedForm (CNF) attribute and the CompressedForm (Comp) attribute are both set to the same form as now found in the ShortForm attribute. This removes the word from further processing such as character reduction and case normalization. This is indicated by block 252. Therefore, the word substitution process can be used to avoid other troublesome situations as well. For example, in German the pronoun "sich" can be required (by word substitution) to remain "sich" in order to avoid later vowel deletion which would result in a common abbreviation for an obscenity. Determining whether the special handling is word substitution is indicated by block 248.

If, at block 248, it is determined that the particular type of special handling to be undertaken is not word substitution, then it is determined at block 254 whether the special handling to be undertaken is that associated with the "wh" words mentioned above. If so, recall that the "wh" words are not to be reduced. In that case, all remaining attributes (ShortForm, CaseNormalizedForm, and CompressedForm) are set to the LongForm. This is indicated by block 256.

If, at block 254, it is determined that the special handling to be undertaken is not that associated with the "wh" words, then it must be one of the other special handling operations discussed above. In that case, the particular special handling step is performed to obtain the ShortForm attribute and the ShortForm attribute is saved. This is indicated by block 258.

Once the special handling has been performed and the ShortForm attribute has been obtained, the ShortForm attribute is submitted for space removal. It is first determined whether space removal is to be done. This is indicated by block 260. If so, then the short form is submitted to a space removal algorithm such as that set out in the following pseudocode.

```
Classify each token as
<EssentialPunct>: assume these need no delineation, and can serve to
delineate all tokens
<CaseDelineable>: includes all normal words/phrases etc where we can
normalize the case
<Number>: numbers (note that these include tokens like "two" that
have been converted to "2")
<SpaceDelineable>: tokens that must have a space around them - like
url's and email addresses
One embodiment of the algorithm:
// start off with the short form sans leading spaces
Result = RemoveLeadingSpaces(<short form>)
// only do this if the token is not NULL
if (Result) {
    FrontSpaceNeeded = FALSE;
    // switch on type of current token
    switch <curtype> {
    case <EssentialPunct>:
        // should be all done. No delineation required
        break;
    case <CaseDelineable>:
        // put in a space if prev type was space delineable
        if (prevtype == <SpaceDelineable>) FrontSpaceNeeded = TRUE;
        break;
    case <Number>:
        // put in a space if prev type is number or space delineable
        if (prevtype == <SpaceDelineable> || prevtype == <Number>
PreviousToken ends in a digit) FrontSpaceNeeded = TRUE;
        break;
    case <SpaceDelineable>:
        // put in a space unless previous token was essential punctuation
        if (prevtype != <EssentialPunct> && !IsFirstTokenInSentence)
FrontSpaceNeeded = TRUE;
        break;
    }
    // set prevtype to current type
    prevtype = curtype;
    if (FrontSpaceNeeded) Result = AddLeadingSpace(<Result>)
}
```

The pseudocode indicates that spaces will not be removed preceding URLs, email addresses, etc., nor will they be removed following those items. However, in other cases, where delineation can be made, spaces will be removed from the ShortForm attribute. This is indicated by block 262.

Next, it is determined whether case normalization is to be performed. This is indicated by block 264. It will be appreciated, for example, that case normalization may not be desired in URLs and emails and other such items that are case sensitive. If that is the case, then the CaseNormalizedForm attribute is set to the ShortForm attribute as indicated by block 266. However, if case normalization is to be performed, then the first letter in each word in the ShortForm attribute (recall that the token can be composed of multiple words) is capitalized, and that is saved as the CaseNormalizedForm attribute. This is indicated by block 268.

It is next determined whether further compression is to be performed. This is indicated by block 270. For example, in a number of the special handling cases mentioned above, vowel removal is not to be performed (such as in pronouns in the English language, the "wh" words, proper names or in the ShortForm of days such as Mon, Tues, etc.). Similarly, vowels or consonants are not to be removed from acronyms, email addresses, URLs, etc.

If further compression is not to be performed, then the CompressedForm attribute is set to the CaseNormalizedForm attribute as indicated in block 272. However, if further compression is to be preformed, then the CaseNormalizedForm is submitted for character reduction (such as the removal of vowels and consonants).

For the present discussion, the term "medial vowels" will mean a single vowel or a sequence of vowels that is not either at the beginning or at the end of a word. In the English language, all medial vowels are removed.

For removing letters in German, consonant cluster simplification rules are first applied. For example, the consonant cluster "sch" is simplified to "sh" except in the diminutive suffix -schen. Also, the consonant cluster "ck" is simplified to "k".

Next, the word-final sequence-ein is replaced with the homophonous –1. Some words in German end in -ein, but it is not homophonous with the number one. Some examples of such words are the following:

Codein, Coffein, Casein, Fluoreszein, Hussein, Kaffein, Kasein, Kleberprotein, Kodein, Lutein, Movein, Nuklein, Nuclein, Olein, Phenolphtalein, Phtalein, Protein, Pygmaein, Talein, Tein, Thein, Zein, Zygstein It should also be noted that if the following word is a number, date, time, etc. (such as anything which may start with a digit), then the "ein" substitution is not performed.

In German, in words that contain only one medial vowel, the vowel is not deleted. For words with more than one medial vowel, every second medial vowel is deleted. The letter "u" between a consonant and a word-final "ng" is deleted. Any cases of "ie" that still remain are converted to "i". Finally, the letter "e" is deleted if it follows a consonant and precedes a word-final "l, m, n or r". Note that a vowel is not deleted if it follows the letter s and precedes the cluster ch since this would result in the sequence sch which German readers have a very strong tendency to interpret as the beginning of a syllable. For the present discussion, vowels typically include aeiou and in some languages y, and all forms with accents, umlauts, and other diacritics. A list sufficient for English, German, French and Spanish is:

æaàáâäeéèêëiíîïœoôòóuüùû ÆAÀÁÂÄEÉÈÊË IÍÎÏŒOÔÒÓUÜÙÛ

For English, German, French and Spanish, consonants include:

qwrtypsdfghjklzxc çvbnñmQWRTYPSDFGHJKLZX CÇVBNÑMß although additional consonant symbols may be added for other languages.

Once character reduction (such as vowel and consonant removal) is performed, as indicated by block 274, the CompressedForm attribute is obtained and saved. This is indicated by block 276. Finally, all five attributes can be output as potential compression options. This is indicated by block 278.

It should also be noted that during traversal of the syntax parse tree, compression can be performed on a non-terminal node level as well. In one embodiment, entire phrases are deleted based on the syntactic analysis. For example, consider the sentence "While I was stuck on the freeway, I remembered to ask you to send me the contact information for Dr. Mary Smith". In this example, the entire sentence initial subordinate clause can be deleted. In other words, the syntactic analysis indicates that it is subordinate and the subordinating conjunction "while" indicates that this is a temporal adverbial clause. Therefore, this entire phrase can simply be deleted to obtain the sentence "I remembered to ask you to send me the contact information for Dr. Mary Smith." The patent application Ser. No. 09/220,836, entitled SYSTEM FOR IMPROVING THE PERFORMANCE OF INFORMATION IDENTIFYING CLAUSES HAVING PERDETERMINED CHARACTERISTICS, filed on Dec. 24, 1998, provides additional information regarding the identification of subordinate clauses and whether those clauses contain relatively important material.

Another example of compressing at the non-terminal node level is with respect to speech act verbs. Speech act verbs are a subclass of what linguists refer to as "complement taking predicates." In the English language, an ambiguity is illustrated in the following sentence:

"John said that he was arriving next Wednesday."

In one reading, the word "he" is co-referential with "John". In another reading, "he" could be someone else. Some elements of this sentence can be deleted without making the output any or more less ambiguous than the input, as follows:

If the subject of the matrix clause speech act verb (in this case "John" the subject of "said") is possibly co-referential with a pronominal subject of the subordinate clause (he), and this can be determined either by noting that they are both masculine, as we know from a morphology lookup, or by using more sophisticated semantic analysis to determine co-reference, then the pronoun in the subordinate clause can be deleted. Note that the subordinating conjunction "that" can also be deleted, to yield:

"John said was arriving next Wednesday".

It should be noted that care must be taken to only delete the subject of the subordinate clause when it is a pronoun, and possibly co-referential with the subject of the main clause. For example, it should not be deleted in the following case:

John said that she was arriving . . .

John said that Bill was arriving . . .

John said that they were arriving . . .

At this point, following through with the example of the sentence illustrated in FIG. 3 may be helpful. As stated earlier, each node in the analysis is iteratively examined to determine whether compression can be accomplished. Therefore, the sentence node (S) is first examined. No compression can be done at this point, so processing proceeds deeper in the analysis and the noun phrase node 300 is examined. No compression can be performed at that level so processing continues deeper to the pronoun node 302. It is seen that the pronoun is "you". Therefore, under the special handling provisions, this can be converted the term "U". This results in the following attributes:

ShortType=Pronouns
LongForm=You
ShortForm=U
CNF=U
Comp.=U

Next processing continues with respect to verb phrase node 304. It is seen that no compression can be performed at this level so the verb node 306 is examined. The term "have" is simply passed through the flow chart illustrated in FIGS. 5A and 5B and subjected to case normalization and vowel removal to obtain the term "Hve". This results in the attributes as follows (wherein the underscore represents a leading space):

ShortType=VerbsDefault
LongForm=_have
ShortForm=_have
CNF=Have
Comp.=Hve

Again, examination of the node 308 is done and it is found that no compression can be done at this level. Therefore, examination proceeds to node 310 where the article "a" is deleted at block 240 in FIG. 5A to yield:

ShortType=Articles
LongForm=_a
ShortForm=Null
CNF=Null
Comp.=Null

The node 312 is then examined, and is subjected to word substitution to result in the five attributes as follows:

ShortType=WordSubstitution
LongForm=_meeting
ShortForm=Mtg
CNF=Mtg
Comp.=Mtg

The prepositional phrase node 314 is then examined and it is determined that no compression can be done at that level. Therefore, the preposition node 316 is examined. Processing moves though the flow chart in FIGS. 5A and 5B and case normalization and vowel removal are conducted to yield the five attributes as follows:

ShortType=PrepsDefault
LongForm=_with
ShortForm=_with
CNF=With
Comp.=Wth

The proper noun node 318 is then examined. It is found, at this node, the three words "Dr. John-Epstein" can be compressed using the ShortType PrprN. This yields the five attributes as follows:

ShortType=PrprN
LongForm=_Dr._John_Epstein
ShortForm=_Epstein
CNF=Epstein
Comp.=Epstein Next, node 320 is examined and is found that this phrase represents an offset date. This is analyzed, through the flow diagram illustrated in FIGS. 5A and 5B to yield the following five attributes:

ShortType=OffsetDate
LongForm=_next_Tuesday
ShortForm=_12/3
CNF=12/3
Comp.=12/3

Next, node 322 is examined and it is determined that no compression can be made at that node. Therefore the preposition node 324 is examined. It is noted, through processing as indicated in FIGS. 5A and 5B that the term "at" is the subject of a word substitution for "@" this yields the five attributes as follows:

ShortType=WordSubstitution
LongForm=_at
ShortForm=_@
CNF=@
Comp.=@

Finally, the node 326 is examined and the only compression that is found is to replace the spelled-out term "ten" with the number "10" to yield the five attributes:

ShortType=Numbers
LongForm=_ten_am
ShortForm=_10 am
CNF=10 am
Comp.=10 am

The compressor 202 is then free to pick and choose among the various compression options illustrated in these data structures to provide a final output compressed version of the text. This can be done very aggressively, as in the case of the display screen on the target device 204 with a very limited size, or it can be done less aggressively, as in the case of a palm top computer with more display space, for instance. Therefore, for example, the most aggressive compression is as follows:

UHveMtgWthEpstein12/3@10 am

Even with very aggressive compression, this is a highly readable and decipherable text message, yet is saves a great deal of space over the original set out in FIG. 3.

Thus, it can be seen that the present invention can be used to provide significant compression, yet the compression is made in a highly linguistically intelligent fashion such that it can be easily deciphered by a human. It also provides a plurality of different compression options for individual words and phrases, which, in most cases, reflect various degrees of aggressiveness. This is tremendously helpful to the downstream components which eventually must choose the best compression sequence in the target device.

Although the present invention has been described with reference to particular embodiments, workers skilled in the art will recognize that changes may be made in form and detail without departing from the spirit and scope of the invention.

What is claimed is:

1. A method of processing a body of text to generate compression options, comprising:

performing a linguistic analysis on the body of text to obtain a plurality of different tokens, comprising one of a word and a number, in the body of text;

after performing the linguistic analysis, automatically generating a plurality of correct compression options for each of a plurality of different corresponding tokens in the body of text to compress the body of text, each of the correct compression options comprising a different, correct compressed form of the corresponding tokens in the body of text wherein generating at least one of the compressed forms comprises reducing a number of letters or numbers in the corresponding token so the compressed form includes some, but not all, letters or numbers in the corresponding tokens;

wherein automatically generating a plurality of correct compression options comprises automatically subjecting each of the tokens in the body of text to different sets of compression rules in a predetermined order to obtain the plurality of correct compression options, such that the plurality of correct compression options reflect varying degrees of compression of a same token in the body of text; and selecting one of the plurality of correct compression options for each of the plurality of different tokens in the body of text and outputting a compressed form of the body of text as the selected compression option for each token.

2. The method of claim 1 wherein automatically generating a plurality of correct compression options comprises:
generating a compression identifier attribute indicative of at least one of the sets of compression rules to which the tokens in the body of text is subjected.

3. The method of claim 2 wherein automatically generating a plurality of correct compression options comprises:
generating a ShortForm attribute indicative of a compressed form of the tokens in the body of text after application of the set of compression rules.

4. The method of claim 3 wherein automatically generating a plurality of correct compression options comprises:
generating a case normalized attribute, based on the ShortForm attribute, indicative of a CaseNormalizedForm of the ShortForm attribute.

5. The method of claim 4 wherein automatically generating a plurality of correct compression options comprises:
generating a compression attribute indicative of a further compressed form of the case normalized attribute.

6. The method of claim 5 wherein generating a compression attribute comprises:
applying letter removal rules to the case normalized attribute to remove letters based on a predetermined location of the letters in the CaseNormalizedForm.

7. The method of claim 6 wherein automatically generating a plurality of correct compression options comprises:
generating a LongForm attribute that reflects substantially no compression of the tokens in the body of text.

8. The method of claim 7 wherein one ShortForm attribute comprises a word substitution based on a dictionary look-up and wherein automatically generating a plurality of correct compression options comprises:
setting the case normalized attribute and the compression attribute to the ShortForm attribute.

9. The method of claim 3 wherein performing a linguistic analysis comprises performing a syntactic analysis on the body of text and wherein generating the ShortForm attribute comprises:
applying the set of compression rules based on the syntactic analysis.

10. The method of claim 9 wherein the linguistic analysis further comprises, prior to performing the syntactic analysis:
performing a lexical analysis on the body of text; and
performing a morphological analysis on the body of text.

11. The method of claim 3 wherein generating the ShortForm attribute comprises:
normalizing dates to a numerical form.

12. The method of claim 3 wherein generating the ShortForm attribute comprises:
normalizing offset dates to a numerical form, based on a date that the body of text was authored.

13. The method of claim 3 wherein generating the ShortForm attribute comprises:
maintaining symbol-sensitive text fragments in uncompressed form.

14. The method of claim 13 wherein maintaining symbol-sensitive text fragments comprises:
maintaining text fragments that, cannot be accurately understood unless maintained fully in-tact, in uncompressed form.

15. The method of claim 14 wherein maintaining text fragments comprises:
maintaining uniform resource locators and electronic mail addresses in uncompressed form.

16. A message handler receiving a message and generating compression options indicative of different forms of a portion of a body of text in the message, the message handler comprising:
a linguistic analyzer linguistically configured to analyze the body of text and provide a linguistic analysis having leaf nodes representing individual tokens in the body of text;
a compression form generator configured to automatically generate a plurality of different compressed forms of at least a plurality of tokens represented by the leaf nodes in the linguistic analysis, the plurality of different compressed forms each representing a correct compressed form of a corresponding individual token,
wherein generating at least one of the compressed forms comprises reducing a number of letters or numbers in the corresponding token so the compressed form includes some, but not all, letters or numbers in the corresponding tokens,
wherein the compression form generator generates the plurality of different compressed forms by automatically subjecting each of the tokens in the body of text to different sets of compression rules in a predetermined order to obtain the plurality of correct compressed forms, such that the plurality of correct compressed forms reflect varying degrees of compression of a same token in the body of text; and
a compressor configured to generate an output indicative of selected ones of the plurality of different compressed forms for the individual tokens in the body of text.

* * * * *